US 6,680,552 B2

(12) United States Patent
Linden et al.

(10) Patent No.: US 6,680,552 B2
(45) Date of Patent: Jan. 20, 2004

(54) FLOW PATH FOR A LIQUID COOLED ALTERNATOR

(75) Inventors: David William Linden, Ann Arbor, MI (US); Kevin Roy Harpenau, Ypsilanti, MI (US); Richard Kenneth Harris, Pinckney, MI (US); Steven John Yockey, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 146 days.

(21) Appl. No.: 10/056,930

(22) Filed: Jan. 24, 2002

(65) Prior Publication Data

US 2003/0137200 A1 Jul. 24, 2003

(51) Int. Cl.⁷ .............................. H02K 9/06; H02K 9/28
(52) U.S. Cl. ........................ 310/62; 310/59; 180/68.1; 123/41.31
(58) Field of Search .................. 310/58, 59, 60 R, 310/62, 60 A, 89; 180/68.1–68.4, 68.6, 65.1, 65.2–65.4; 123/41.31, 41.4, 142.5 R, 142.5 E

(56) References Cited

U.S. PATENT DOCUMENTS

| 2,294,586 | A | | 9/1942 | Troller |
| 2,479,233 | A | | 8/1949 | Haas |
| 4,418,295 | A | | 11/1983 | Shiga |
| 4,464,594 | A | | 8/1984 | Matsumoto et al. |
| 4,488,070 | A | | 12/1984 | Iwaki et al. |
| 4,617,485 | A | | 10/1986 | Nakamura et al. |
| 4,659,950 | A | | 4/1987 | Gotoh |
| 4,686,399 | A | | 8/1987 | Imori et al. |
| 4,757,221 | A | | 7/1988 | Kurihashi et al. |
| 4,794,285 | A | | 12/1988 | Nimura et al. |
| 4,935,689 | A | * | 6/1990 | Fujikawa et al. ............... 322/1 |
| 5,021,696 | A | | 6/1991 | Nelson |

(List continued on next page.)

FOREIGN PATENT DOCUMENTS

| EP | 0 300 063 | 1/1989 |
| EP | 0 539 339 | 4/1993 |
| JP | 54-46306 | 4/1979 |
| JP | 55-66249 | 5/1980 |
| JP | 56-1749 | 1/1981 |
| JP | 56-86052 | 7/1981 |
| JP | 57-6551 | 1/1982 |
| JP | 62-160055 | 7/1987 |
| JP | 63-77357 | 4/1988 |

(List continued on next page.)

OTHER PUBLICATIONS

Copyright: ©1979, JPO&Japio translation of Abstract corresponding to Japanese Patent No. 54–46306—Apr. 12, 1979.
Copyright: ©1980, JPO&Japio translation of Abstract corresponding to Japanese Patent No. 55–66249 May 19, 1980.
Copyright: ©1981, JPO&Japio translation of Abstract corresponding to Japanese Patent No. 56–1749 Jan. 9, 1981.

(List continued on next page.)

Primary Examiner—Tran Nguyen
(74) Attorney, Agent, or Firm—Brinks Hofer Gilson & Lione

(57) ABSTRACT

An alternator includes an inner housing and an outer housing. A pair of o-rings positioned therebetween create a sealed flow chamber having a first flow channel, a second flow channel and an axial passageway. The first flow channel is a disk shaped cavity extending diametrically across the alternator. The second flow channel forms an annular jacket extending entirely around the alternator. The axial passageway directs coolant axially from the first flow channel into the second flow channel. An inlet positioned diametrically across from the axial passageway allows coolant to enter the first flow channel, such that coolant entering the inlet must flow diametrically across the alternator to reach the axial passageway. An outlet positioned diametrically across from the axial passageway allows coolant to exit the flow chamber, such that coolant entering the second flow channel must travel annularly around the alternator to reach the outlet.

5 Claims, 4 Drawing Sheets

U.S. PATENT DOCUMENTS

| | | | |
|---|---|---|---|
| 5,028,826 | A | 7/1991 | Kitamura |
| 5,093,591 | A | 3/1992 | Kitamura et al. |
| 5,095,235 | A | 3/1992 | Kitamura |
| 5,149,997 | A | 9/1992 | Suomela |
| 5,194,770 | A | 3/1993 | Yoshioka et al. |
| 5,233,255 | A | 8/1993 | Kusumoto et al. |
| 5,235,229 | A | 8/1993 | Tanaka et al. |
| 5,241,230 | A | 8/1993 | Tanaka et al. |
| 5,250,864 | A | 10/1993 | Kusumoto et al. |
| 5,306,977 | A | 4/1994 | Hayashi |
| 5,345,132 | A | 9/1994 | Sasaki et al. |
| 5,424,600 | A | 6/1995 | Ishikawa et al. |
| 5,561,334 | A | 10/1996 | Ishida et al. |
| 5,705,865 | A | 1/1998 | Ishida et al. |
| 5,710,467 | A | 1/1998 | Irie et al. |
| 5,742,107 | A | 4/1998 | Asao et al. |
| 5,751,079 | A | 5/1998 | Bagherpour et al. |
| 5,763,968 | A | 6/1998 | Hayashi et al. |
| 5,777,407 | A | 7/1998 | Ishida et al. |
| D401,319 | S | 11/1998 | Bradley |
| 5,837,270 | A * | 11/1998 | Burgess ............... 424/401 |
| 5,875,863 | A * | 3/1999 | Jarvis et al. ........... 180/65.4 |
| 5,952,749 | A | 9/1999 | Umeda et al. |
| 5,977,668 | A | 11/1999 | Yoshioka |
| 5,977,669 | A | 11/1999 | Yoshida et al. |
| 6,018,205 | A | 1/2000 | Ohashi et al. |
| 6,023,112 | A | 2/2000 | Asao |
| 6,057,627 | A | 5/2000 | Ragaly |
| 6,060,802 | A | 5/2000 | Masegi et al. |
| 6,082,316 | A * | 7/2000 | Ban et al. ............. 123/142.5 R |
| 6,124,660 | A | 9/2000 | Umeda et al. |
| 6,172,433 | B1 | 1/2001 | Asao |
| 6,198,187 | B1 | 3/2001 | Asao et al. |
| 6,198,188 | B1 | 3/2001 | Ihata |
| 6,285,100 | B1 | 9/2001 | Pflueger et al. |
| 2001/0010434 | A1 | 8/2001 | Ishida et al. |
| 2001/0026102 | A1 | 10/2001 | Asao et al. |
| 2001/0054852 | A1 | 12/2001 | Nakamura et al. |

FOREIGN PATENT DOCUMENTS

| | | |
|---|---|---|
| JP | 63-181637 | 7/1988 |
| JP | 63-265545 | 11/1988 |
| JP | 63-274342 | 11/1988 |
| JP | 56-53555 | 5/1991 |
| JP | 3-235644 | 10/1991 |
| JP | 3-265450 | 11/1991 |
| JP | 4-244770 | 9/1992 |
| JP | 5-111221 | 4/1993 |
| JP | 5-111222 | 4/1993 |
| JP | 5-137297 | 6/1993 |
| JP | 5-219685 | 8/1993 |
| JP | 5-236701 | 9/1993 |
| JP | 5-268749 | 10/1993 |
| JP | 5-336704 | 12/1993 |
| JP | 6-78479 | 3/1994 |
| JP | 6-78504 | 3/1994 |
| JP | 6-98511 | 4/1994 |
| JP | 6-113505 | 4/1994 |

OTHER PUBLICATIONS

Copyright: ©1981, JPO&Japio translation of Abstract corresponding to Japanese Patent No. 56–53555 May 13, 1991.

Copyright: ©1981, JPO&Japio translation of Abstract corresponding to Japanese Patent No. 56–86052 Jul. 13, 1981.

Copyright: ©1982, JPO&Japio translation of Abstract corresponding to Japanese Patent No. 57–6551 Jan. 13, 1982.

Copyright: ©1987, JPO&Japio translation of Abstract corresponding to Japanese Patent No. 62–160055 Jul. 16, 1987.

Copyright: ©1988, JPO&Japio translation of Abstract corresponding to Japanese Patent No. 63–77357 Apr. 7, 1988.

Copyright: ©1988, JPO&Japio translation of Abstract corresponding to Japanese Patent No. 63–265545 Jul. 26, 1988.

Copyright: ©1988, JPO&Japio translation of Abstract corresponding to Japanese Patent No. 63–274342 Nov. 2, 1988.

Copyright: ©1991, JPO&Japio translation of Abstract corresponding to Japanese Patent No. 3–235644 Oct. 21, 1991.

Copyright: ©1991, JPO&Japio translation of Abstract corresponding to Japanese Patent No. 3–265450 Nov. 26, 1991.

Copyright: ©1992, JPO&Japio translation of Abstract corresponding to Japanese Patent No. 4–244770 Sep. 1, 1992.

Copyright: ©1993JPO&Japio translation of Abstract corresponding to Japanese Patent No. 5–111222 Apr. 30, 1993.

Copyright: ©1993JPO&Japio translation of Abstract corresponding to Japanese Patent No. 5–111221 Apr. 30, 1993.

Copyright: ©1993JPO&Japio translation of Abstract corresponding to Japanese Patent No. 5–137297 Jun. 1, 1993.

Copyright: ©1993JPO&Japio translation of Abstract corresponding to Japanese Patent No. 5–219685 Aug. 27, 1993.

Copyright: ©1993JPO&Japio translation of Abstract corresponding to Japanese Patent No. 5–236701 Sep. 10, 1993.

Copyright: ©1993JPO&Japio translation of Abstract corresponding to Japanese Patent No. 5–268749 Oct. 15, 1993.

Copyright: ©1993JPO&Japio translation of Abstract corresponding to Japanese Patent No. 5–336704 Dec. 17, 1993.

Copyright: ©1994JPO&Japio translation of Abstract corresponding to Japanese Patent No. 6–78479 Mar. 18, 1994.

Copyright: ©1994JPO&Japio translation of Abstract corresponding to Japanese Patent No. 6–78504 Mar. 18, 1994.

Copyright: ©1994JPO&Japio translation of Abstract corresponding to Japanese Patent No. 6–98511 Apr. 8, 1994.

Copyright: ©1994JPO&Japio translation of Abstract corresponding to Japanese Patent No. 6–113505 Apr. 22, 1994.

* cited by examiner

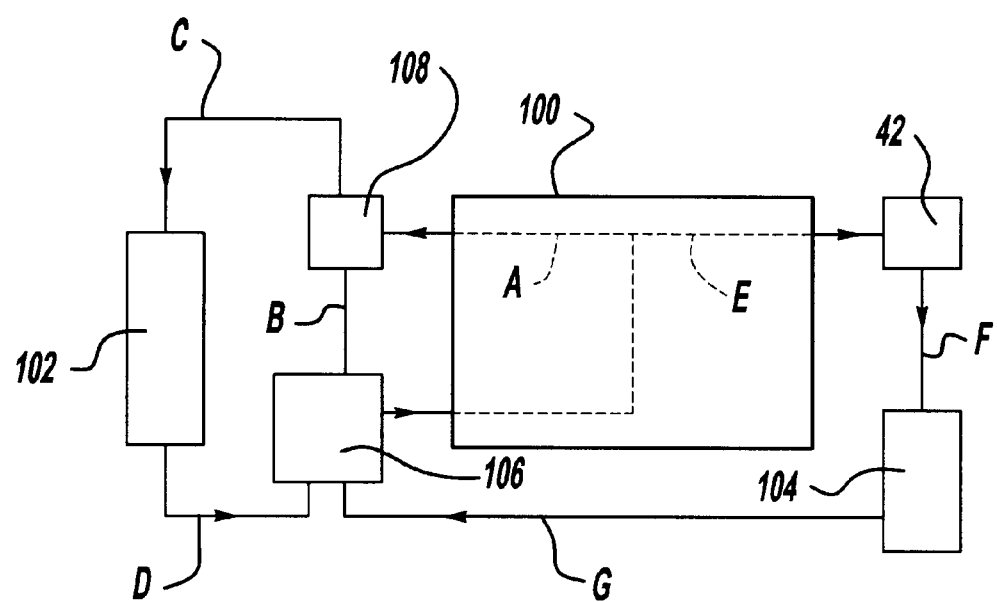
_Figure - 5_

FLOW PATH FOR A LIQUID COOLED ALTERNATOR

FIELD OF INVENTION

The invention relates to an automotive electrical alternator, and particularly to an alternator having coolant channels adapted to pass engine coolant therethrough to cool the alternator.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; increasingly sophisticated powertrain control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

One concern with higher power producing alternators is heat production. Fans mounted on the front of the alternator will circulate air across the front side to help cool the alternator, however, with higher output alternators, there is too much heat produced to be dissipated by these fans. Liquid cooled alternators dissipate the heat more effectively, but require extra size to accommodate cooling flow channels.

Therefore, there is a need for an improved alternator having flow channels to allow the alternator to be liquid cooled while still maintaining a small compact size.

SUMMARY OF THE INVENTION

In a first aspect of the present invention, an alternator includes an inner housing and an outer housing mounted over the inner housing with a pair of O-rings positioned therebetween to define a sealed flow chamber having a first flow channel, a second flow channel and an axial passageway interconnecting the first and second flow channels.

The first flow channel is defined by opposing first and second disk shaped portions of the inner housing, such that the first flow channel is a disk shaped cavity extending diametrically across the alternator. The second flow channel is defined by an inner diameter of the outer housing and an outer diameter of the inner housing, such that the second flow channel forms an annular jacket extending entirely around the alternator. The axial passageway is defined by an arcuate notch formed within the first disk shaped portion of the inner housing such that coolant is directed axially from the first flow channel into the second flow channel through the axial passageway.

An inlet extends from the first flow channel and is adapted to allow coolant to enter the first flow channel. The inlet is positioned diametrically across from the axial passageway such that coolant entering the inlet must flow diametrically across the alternator to reach the axial passageway. An outlet extends from the second flow channel and is adapted to allow coolant to exit the flow chamber. The outlet is positioned diametrically across from the axial passageway such that coolant entering the second flow channel must travel annularly around the alternator to reach the outlet.

In another aspect of the present invention, the inlet and the outlet are adapted to connect to a coolant system of an automobile such that engine coolant is circulated through the electric machine.

In still another aspect of the present invention, the alternator comprises a shaft rotatably supported within the inner housing by a pair of bearing elements, having a pulley mounted to a first end and a pair of slip rings mounted to a second end. A rotor assembly, including first and second pole pieces, is mounted onto the shaft with an excitation winding mounted between the first and second pole pieces and a stator assembly is fixedly mounted within the inner housing in functional engagement with the rotor assembly.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 5 is a schematic view of a cooling system for an automobile incorporating an alternator of the present invention.

DESCRIPTION OF THE PREFERRED EMBODIMENTS

Figure 1:
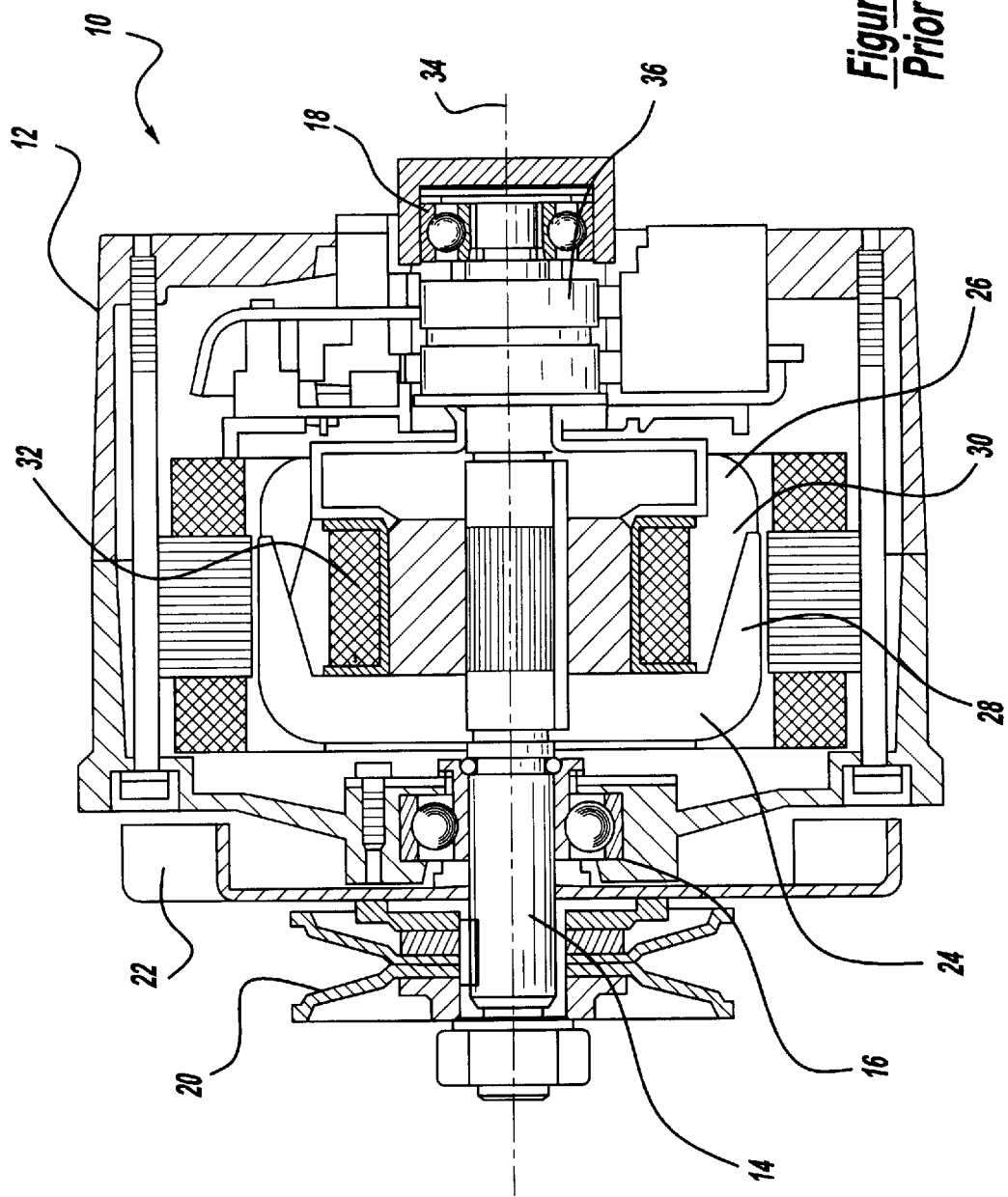
FIG. 1 is a cross sectional view of a typical prior art electrical alternator.

In order to provide a framework for a further detailed description of the preferred embodiments of this invention, FIG. 1 is presented illustrating a prior art electrical alternator configuration. That figure illustrates an electrical alternator 10 enclosed within a housing 12. An alternator rotor shaft 14 is supported by rolling element bearings 16 and 18. A belt driven pulley 20 is fastened to the protruding front end of rotor shaft 14. A fan 22 rotates with shaft 14 and provides cooling airflow for removing heat from alternator 10. Front and rear alternator poles 24 and 26, respectively, rotate with the shaft 14 and have extending claw fingers 28 and 30, respectively. Fingers 28 and 30 interlace to create the well known "claw pole" rotor configuration. Excitation winding 32 is carried within the cavity formed between poles 24 and 26. A DC excitation signal is applied to excitation winding 32 through a pair of slip rings 34 and 36, and associated brushes.

Rotor assembly 38 which includes pole pieces 24 and 26, winding 32, and slip rings 34 and 36, produces an alternating polarity magnetic field which rotates with rotation of the rotor assembly. Although a DC excitation signal is applied to slip rings 34 and 36, the interlacing of alternating poles 24 and 26 creates an alternating polarity magnetic field as presented to the windings of stationary core 40 located radially around rotor assembly 38. The movement of the alternating polarity magnetic field presented by rotor assembly 38 across the windings of core 40 generates electricity in a well-known manner.

Electrical energy output by electrical alternator 10 generated within core 40 is directed to rectifying diodes (not shown) and perhaps further filtering and power conditioning devices before being connected with the vehicle's electric distribution bus. Sophisticated control systems, also known as voltage regulators, are used to apply an appropriate level of DC voltage to excitation windings 32 to generate the desired RMS value of the outputted alternating current from alternator 10, which can be in single phase or multi-phase form, depending on the winding design of core 40.

Figure 2:
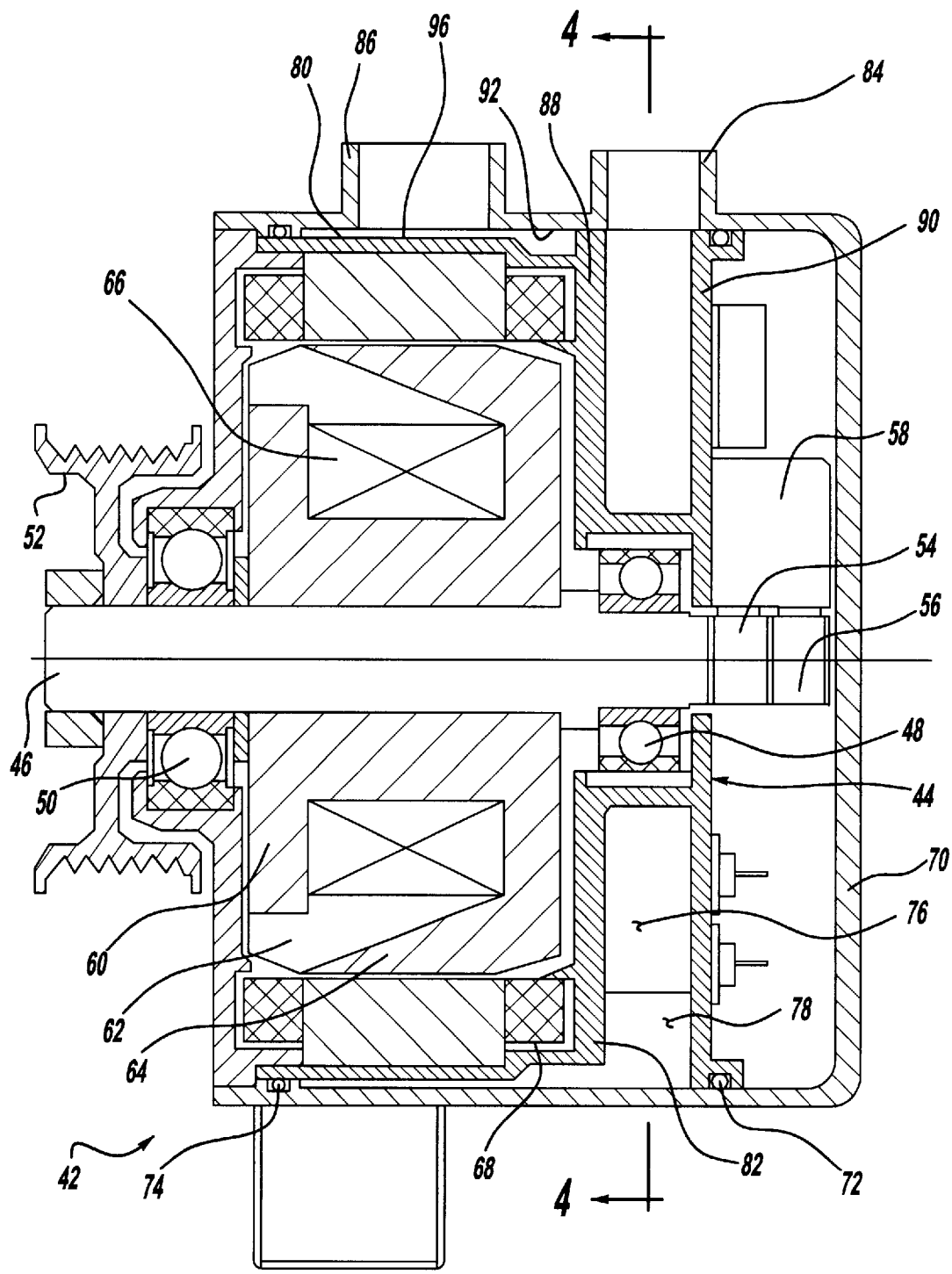
FIG. 2 is a cross sectional view of an alternator of the present invention.

Referring to FIG. 2, an alternator of the present invention is shown generally at 42. The alternator 42 includes an inner housing 44 which is adapted to support internal components of the alternator 42. A rotor shaft 46 is rotatably supported within the inner housing by a pair of bearing elements 48 and 50. A pulley 52 is mounted to a first end of the shaft 46 and is adapted to engage a drive belt (not shown) to provide rotating drive to the shaft 46 of the alternator 42. A pair of slip rings 54 and 56 are mounted to a second end of the shaft 46 and are adapted to engage brushes 58 within the alternator 42.

A rotor assembly 60 is mounted within the inner housing 44. The rotor housing includes first and second pole pieces 62 and 64 mounted onto the shaft 46. An excitation winding 66 is mounted between the first and second pole pieces 62 and 64. A stator assembly 68 is fixedly mounted within the inner housing 44 in functional engagement with the rotor assembly 60.

An outer housing 70 is mounted over the inner housing 44 and a pair of o-rings 72 and 74 are positioned between the inner housing 44 and the outer housing 70, thereby creating a sealed flow chamber 76. The flow chamber 76 includes a first flow channel 78, a second flow channel 80 and an axial passageway 82 interconnecting the first flow channel 78 to the second flow channel 80.

An inlet 84 extends from the first flow channel 78 and is adapted to connect to a source of coolant and allow coolant to enter the first flow channel 78. An outlet 86 extends from the second flow channel 80 and is adapted to allow coolant to exit the flow chamber 76.

Figure 3:
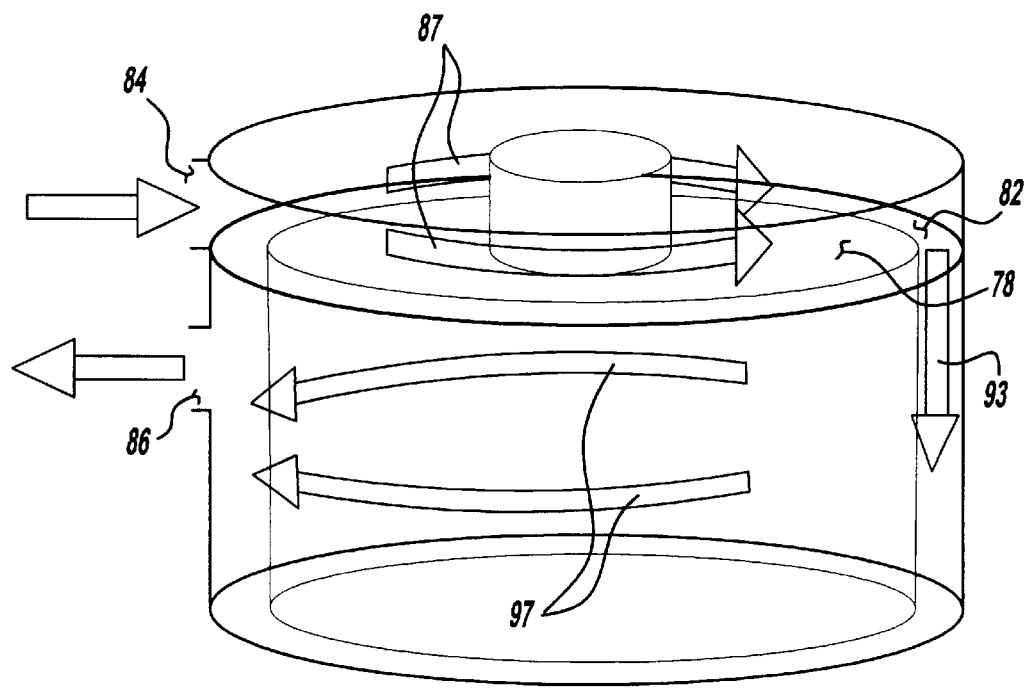
FIG. 3 is a schematic view of the alternator of FIG. 2 showing how the coolant flows through the alternator.

Preferably, the inlet 84 and the outlet 86 extend from a side of the outer housing 70 and the axial passageway 82 is positioned adjacent the outer housing 70 diametrically across from the inlet 84 and the outlet 86. Referring to FIG. 3, coolant entering the first flow chamber 78 must flow diametrically across the alternator 42 to an opposite side as shown by arrows 87. Referring again to FIG. 2, the first flow channel 78 is defined by a first disk shaped portion 88 of said inner housing 44 positioned at a distance from a second disk shaped portion 90 of said inner housing 44 and an inner diameter 92 of the outer housing 70.

Figure 4:
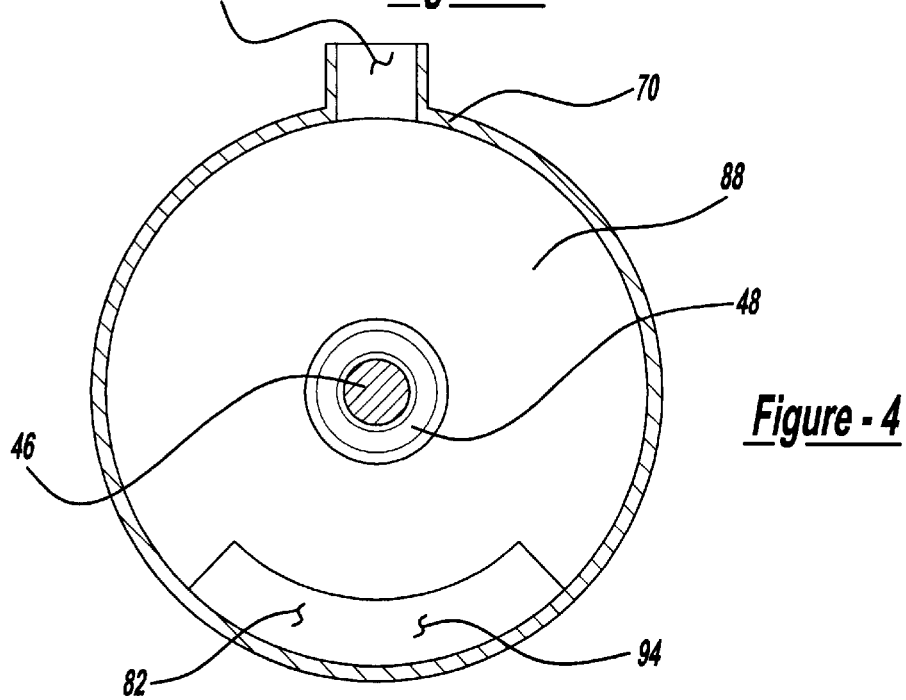
FIG. 4 is sectional view of the alternator of FIG. 2 taken along line 4—4.

Referring again to FIG. 3, the coolant then changes direction 90 degrees and flows axially through the passageway 82 and into the second flow channel 80 as shown by arrow 93. The passageway 82 is defined by an arcuate notch 94 formed within the first disk shaped portion 88 as shown in FIG. 4.

Referring again to FIG. 2, the second flow channel 80 extends annularly around said alternator 42 and is defined by the cylindrical inner diameter 92 of the outer housing 70, a cylindrical outer diameter 96 of the inner housing 44 and the first disk shaped portion 88. The second flow channel 80 forms an annular jacket which extends 360 degrees around the alternator 42 such that the coolant flowing into the second flow channel 80 splits evenly and flows tangentially back toward the outlet 86 on the opposite side around both sides of the alternator 42, as shown by arrows 97 in FIG. 3, to provide cooling 360 degrees around the alternator 42.

Preferably, the inlet 84 and the outlet 86 are adapted to connect to the coolant system of an automobile. The design of the present invention allows the alternator 42 to be compact enough to be placed upstream of a heater core so that the heat absorbed by the coolant flowing through the alternator 42 is then used in the heater core to provide warm air to the interior of the vehicle.

Referring to FIG. 5, an engine cooling system incorporating an alternator 42 of the present invention is shown generally at 98. The system 98 includes an engine 100, a radiator 102, an alternator 42 and a heater core 104. Coolant is pumped through the system 98 by a water pump 106. Coolant is pumped into the engine 100 from the water pump 106. The coolant picks up heat from the engine and then flows from the engine 100 to a thermostat 108, as shown by line A.

The thermostat 108 is a temperature sensitive valve that keeps the coolant from flowing into the radiator 102 until the coolant reaches a set temperature. This is provided to ensure rapid engine 100 heating to allow the engine 100 to reach the appropriate running temperature prior to the coolant being diverted into the radiator 102 for cooling. If the coolant at the thermostat 108 is cooler than the set temperature, then the coolant is diverted directly back to the water pump 106 as shown by line B. If the coolant is higher than the set temperature, then the thermostat 108 allows hot coolant to flow into the top of the radiator 102, shown by line C, and cooled coolant to flow from the bottom of the radiator 102 to the water pump 106, shown by line D. When the temperature of the coolant passing through the thermostat cools below the set temperature, then the thermostat 108 again diverts the coolant back to the water pump 106.

Heated coolant also flows from the engine to the alternator 42, as shown by line E. The coolant picks up additional heat from the alternator 42 and then flows into the heater core 104 as shown by line F. The heater core 104 is like a small radiator such that a fan blows air through the heater core 104 and the air is heated, thereby cooling the coolant within the heater core 104, and providing heated air to the interior of the vehicle. The coolant then flows from the heater core 104 to the water pump 106, as shown by line G.

While the above description constitutes the preferred embodiment of the present invention, it will be appreciated that the invention is susceptible to modification, variation and change without departing from the proper scope and fair meaning of the accompanying claims.

We claim:

1. An alternator comprising:

an Inner housing;

an outer housing mounted over said inner housing;

a pair of o-rings positioned between said inner housing and said outer housing thereby creating a sealed flow chamber therebetween;

said flow chamber including a first flow channel, a second flow channel and an axial passageway interconnecting said first and second flow channels;

said first flow channel being defined by opposing first and second disk shaped portions of said inner housing, such that said first flow channel is a disk shaped cavity extending diametrically across said alternator;

said second flow channel being defined by an inner diameter of said outer housing and an outer diameter of said inner housing, such that said second flow channel forms an annular jacket extending entirely around said alternator;

said axial passageway being defined by an arcuate notch formed within said first disk shaped portion of said inner housing such that coolant is directed axially from said first flow channel into said second flow channel through said axial passageway;

an inlet extending from said first flow channel to allow coolant to enter said first flow channel, said inlet being positioned diametrically across from said axial passageway such that coolant entering said inlet must flow diametrically across said alternator to reach said axial passageway;

an outlet extending from said second flow channel to allow coolant to exit said flow chamber, said outlet being positioned diametrically across from said axial passageway such that coolant entering said second flow channel must travel annularly around said alternator to reach said outlet.

2. The electric machine of claim 1 wherein said inlet and said outlet are adapted to connect to a coolant system of an automobile such that engine coolant is circulated through said alternator.

3. The alternator of claim 1 further comprising:

a shaft rotatably supported within said inner housing by a pair of bearing elements, having a pulley mounted to a first end and a pair of slip rings mounted to a second end;

a rotor assembly Including first and second pole pieces mounted onto said shaft with an excitation winding mounted between said first and second pole pieces;

a stator assembly fixedly mounted within said Inner housing in functional engagement with said rotor assembly.

4. A coolant system for an internal combustion engine for an automobile comprising:

an engine having flow passages therein to allow coolant to flow through the engine;

a radiator to cool the coolant flowing therethrough;

a heater core to receive heated coolant that has passed through the engine and to provide heated air to a passenger compartment of the automobile;

an alternator having flow passages therein to allow coolant to flow through the alternator, the alternator being positioned up-stream of the heater core such that heat transferred from the alternator to the coolant is utilized by the heater core to provide heated air to a passenger compartment of the automobile, wherein the alternator including an outer housing mounted over an inner housing forming a sealed flow chamber, wherein the sealed flow chamber having a first disk-shaped radial flow channel, a second annular-shaped radial flow channel and an axial passageway interconnecting between the disk-shaped radial flow channel and the second annular-shaped radial flow channel.

5. The coolant system of claim 4, wherein the sealed flow chamber being defined by a pair of o-rings positioned between the inner housing and the outer housing; and, the disk-shaped first radial flow channel being defined by opposing first and second disk shaped portions of the inner housing, such that the disk-shaped first flow channel extending diametrically across the alternator; and, the annual-shaped radial second flow channel being defined by an inner diameter of the outer housing and an outer diameter of the inner housing extending entirely around the alternator; and, the axial passageway being defined by an arcuate notch formed within the first disk shaped portion of the inner housing such that coolant is directed axially from the first flow channel into the second flow channel through the axial passageway; and, wherein the alternator further including:

an inlet extending from the first flop channel to allow coolant to enter the first flow channel, the inlet being positioned diametrically across from the axial passageway such that coolant entering the inlet must flow diametrically across the alternator to reach the axial passageway; and, an outlet extending from the second flow channel to allow coolant to exit the flow chamber, the outlet being positioned diametrically across from the axial passageway such that coolant entering the second flow channel must travel angularly around the alternator to reach the outlet;

a shaft rotatable supported within the inner housing by a pair of bearing elements, having a pulley mounted to a first end and a pair of slip rings mounted to a second end;

a rotor assembly including first and second poles mounted onto the shaft with an excitation winding mounted between the first and second poles', and a stator fixedly mounted within the inner housing in functional engagement with the rotor assembly.

* * * * *

UNITED STATES PATENT AND TRADEMARK OFFICE
CERTIFICATE OF CORRECTION

PATENT NO. : 6,680,552 B2  Page 1 of 1
APPLICATION NO. : 10/056930
DATED : January 20, 2004
INVENTOR(S) : David W. Linden et al.

It is certified that error appears in the above-identified patent and that said Letters Patent is hereby corrected as shown below:

Col. 5, in claim 1, line 2, delete "Inner" and substitute --inner-- in its place.

Col. 5, in claim 3, line 6, delete "Including" and substitute --including-- in its place.

Col. 5, in claim 3, line 9, delete "Inner" and substitute --inner-- in its place.

Signed and Sealed this

Twenty-sixth Day of February, 2008

JON W. DUDAS
*Director of the United States Patent and Trademark Office*